Oct. 29, 1935.  J. OSTERTAG  2,018,803
MARINE POWER PLANT APPARATUS
Original Filed July 7, 1928
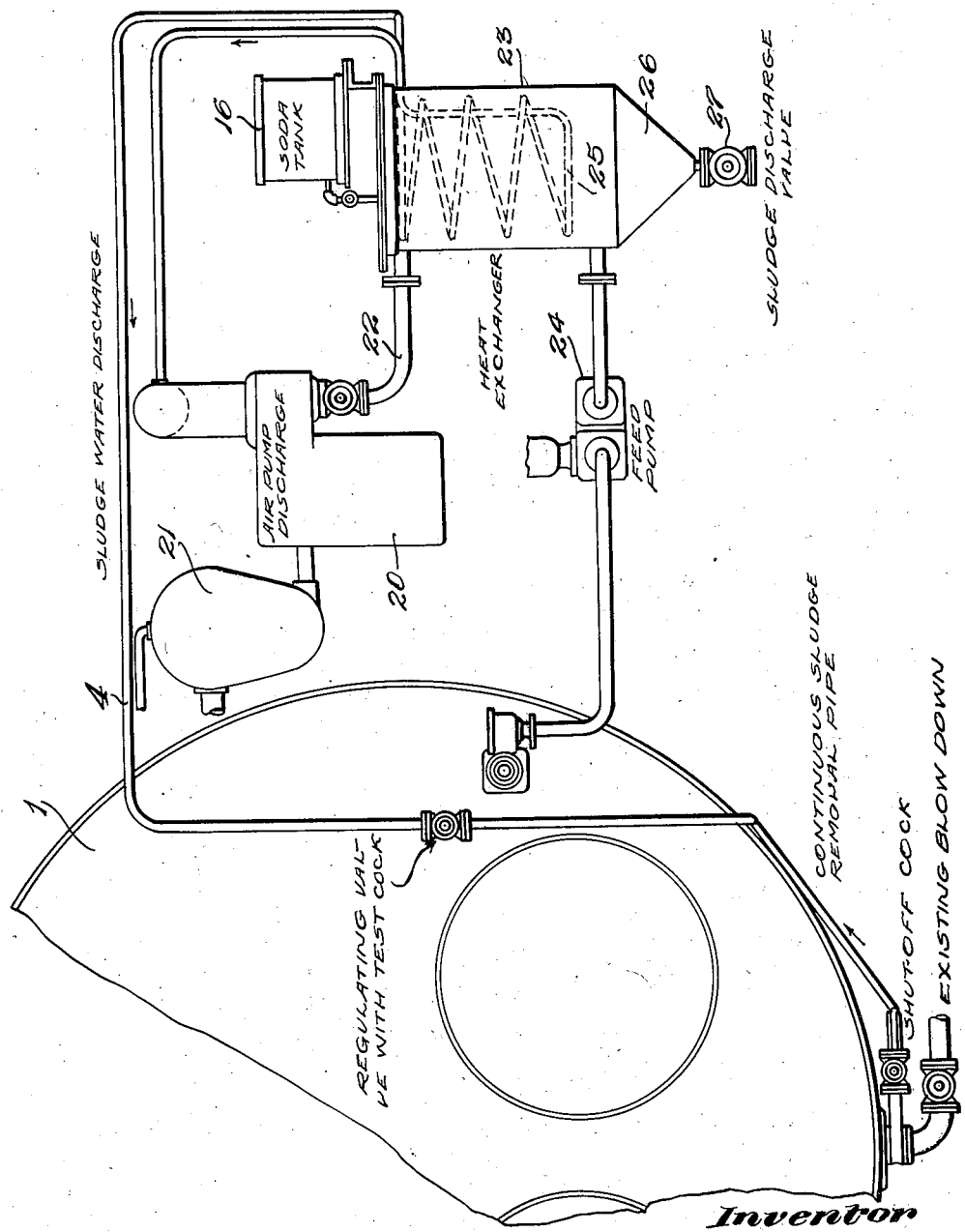

Patented Oct. 29, 1935

2,018,803

UNITED STATES PATENT OFFICE 2,018,803

MARINE POWER PLANT APPARATUS

Julius Ostertag, Stuttgart, Wurttemberg, Germany

Original application July 7, 1928, Serial No. 291,079. Divided and this application April 2, 1934, Serial No. 718,630

1 Claim. (Cl. 122—382)

This application is a division of my copending application Serial No. 291,079, filed July 7, 1928 for Marine power plants.

My present invention relates to an apparatus for purifying feed water for marine boilers. My invention is especially suitable for feed water having a high carbonate hardness, particularly in cases where large quantities of insoluble salts are produced as a result of driving off carbon dioxide from the substances causing carbonate hardness, in addition to any such salts previously present in the unpurified feed water.

Control of the condition of the boiler water in marine boiler practice involves difficulties not met with in stationary boiler operation because of the limited space and the entirely different operating conditions. The present invention contemplates a simple arrangement, occupying little space, for removing scale-forming salts, for preventing concentration of sludge and soluble salts, for maintaining a fixed alkalinity in the boiler water, and for preventing corrosion.

These desirable results are obtained by providing each boiler with a blow down pipe for continuously removing definite quantities of boiler water containing sludge, by adding definite quantities of soda ash to the boiler feed, and by maintaining a proper hydroxide concentration in the boiler water. The heat in the blow-off water is conserved by reducing the pressure to liberate steam, and transferring the heat of the steam and the remaining blow-off water to the feed-water, and, where possible, a large part of the blow-off water is returned to the boilers.

Other desirable features will be apparent from the detailed description following, in conjunction with the appended drawing, wherein:

The figure is a view, partly in section, of an arrangement suitable for use with marine installations of the jet condenser type.

Considering the figure, air pump 20 pumps air and water from a jet condenser 21. A valve controlled pipe 22 leads a desired quantity of feed water from the air pump discharge into a settling tank 23, from which tank the feed pump 24 supplies the boiler 1.

The sludge-water carrier pipe 4 has a submerged coil 25 within the tank 23, the blow-off water giving up its heat to the tank contents before discharging into the air pump discharge at a point past the point of connection of pipe 22 to outboard. A chemical tank 16 supplies a regulated quantity of chemicals such as soda ash to the settling tank. The separated sludge descends into the conical bottom 26, and is periodically discharged through the valve controlled discharge pipe 27.

The water treatment for marine installations thus comprises a continuous predetermined blow-off for maintaining the sludge concentration within desired limits, a soda ash treatment for the feed water to maintain a proper alkalinity of the boiler water, a utilization of the heat of the blow-off water, and, when possible, a return of a large part of the blow-off water to the boiler.

I claim:

In a power plant, a boiler, a condenser, a hot well, a condenser pump for pumping air and water from said condenser, a conduit for conducting the water discharge from said pump into said hot well, and a conduit in open communication with said boiler and the air pump discharge and in heat-exchange relation to the contents of said hot well.

JULIUS OSTERTAG.